Patented May 6, 1941

2,240,920

UNITED STATES PATENT OFFICE 2,240,920

SULPHONATION OF ORGANIC COMPOUNDS

James Herbert Werntz, Wilmington, Del., assignor to E. I. du Pont de Nemours & Company, Wilmington, Del., a corporation of Delaware No Drawing. Application October 17, 1939, Serial No. 299,811

16 Claims. (Cl. 260—686)

This invention relates to the manufacture of organic sulphonates in which the sulphonic group is attached to an aliphatic carbon atom, and more particularly to the manufacture of alkali metal alkenesulphonates. The invention is directed particularly to processes for preparing these compounds by reacting at a temperature above about 60° C. salts of chlorosulphonic acid, especially alkali metal chlorosulphonates, with unsaturated organic compounds containing at least one non-benzenoid carbon to carbon double bond (olefinic linkage) and more particularly with hydroxyl free unsaturated organic compounds containing at least one olefinic linkage. More particularly the invention is directed to reacting alkali metal chlorosulphonates with unsaturated organic compounds free of sulphatable groups and containing an olefinic linkage comprised in an aliphatic hydrocarbon chain of at least three carbon atoms at a temperature sufficient to cause evolution of hydrogen chloride, and still more particularly to reacting salts of chlorosulphonic acid with olefinic hydrocarbons, especially aliphatic mono-olefinic hydrocarbons.

The customary procedures for sulphonating and sulphating organic compounds involve the use of such reagents as sulphuric acid, sulphur trioxide, or chlorosulphonic acid. The terms "sulphonating" and "sulphating" should be distinguished in that the former reaction gives rise to carbon-sulphur linkages whereas the latter gives rise to carbon-oxygen-sulphur linkages. These sulphonating or sulphating reagents are characterized by extreme activity and in many instances the desired sulphonation constitutes only a minor portion of the reaction, while a large portion consists of products resulting from oxidation, dehydration, and otherwise destructive action. Thus, although these reagents have been used widely in sulphonation and sulphation processes, it is recognized that their extreme reactivity leaves much to be desired by way of clean-cut products, especially as applied to olefines. Moreover, in the preparation of alkali metal sulphonates, such processes require further a neutralization step which because of the close control required is uneconomical and undesirable.

I have now found that by preparing organic sulphonates in accordance with the present invention as outlined above and as set forth hereinafter, substantial advantages are to be obtained as compared to previously known methods. In the first place, my invention provides processes for preparing in a single step a salt of an organic sulphonic acid. This property is especially useful in the preparation of surface active products since it eliminates the necessity of a controlled neutralization step as generally required with the use of sulphuric acid, sulphur trioxide, chlorosulphonic acid, etc. Moreover, from a cost standpoint the processes of my invention provide an economical advantage gained by the elimination of a subsequent neutralization step with alkali. In the second place, being a comparatively mild sulphonating agent without causing excessive decomposition or charring of organic materials, sodium chlorosulphonate used in accordance with my invention enables one to operate the processes at reasonably higher temperatures without excessive charring action or undesirable side reaction.

The nature of my invention may be more fully understood from a consideration of possible reactions involved. It is to be understood, however, that I do not wish to be bound by any particular theory of the reactions involved. Nonetheless, my investigation indicates that chlorosulphonates may be considered as acting upon non-benzenoid carbon to carbon double bonds by addition rather than by substitution as indicated by the following typical equation:

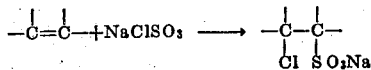

A further reaction in which the addition product may be considered as undergoing at least partial dehydrohalogenation could take place when the addition product is a sodium 2-chloro-1-alkanesulphonate according to the following typical equation:

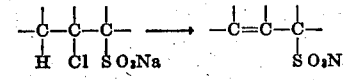

Thus, unsaturation persists and the final product is, at least to a large extent, a sodium alkenesulphonate. Whether the reaction follows this course or some other, still I have found that unsaturated compounds containing at least three carbon atoms, which theoretically should yield addition products as represented above, evolve hydrogen chloride when heated with alkali metal chlorosulphonate, even tho the compound be free of sulphatable groups.

A similar dehydrohalogenation is, of course, known to take place in sulphonation reactions carried out with chlorosulphonic acid, but under the conditions necessary to obtain effective dehydrohalogenation the extreme activity of chlorosulphonic acid leads to undesirable side reactions involving oxidation, dehydration and addition reactions. It might also be inferred from U. S. Patent 2,075,914 (4/6/37) that some sulphonation takes place in the treatment of unsaturated alcohols with sodium chlorosulphonate, but it is an object of the patent to avoid sulphonation and it is only by properly observing the conditions which I have found necessary according to my invention that any practical sulphonation can be obtained.

The sodium chlorosulphonate used in the present invention is prepared by reacting sodium chloride and sulphur trioxide in an appropriate apparatus with suitable grinding. The resulting product contains approximately 68–72% of active material, the remainder being inert sodium chloride and small amounts of sodium acid sulphate. A product of greater active material content can be used with similar results. In the case of unsaturated compounds which are liquids at ordinary temperature or have a high boiling point, a slurry of the organic compound and sodium chlorosulphonate is heated in a suitable vessel placed on the bath and equipped with an efficient stirrer. Usually the reaction sets in with an evolution of acidic fumes. When the heating is discontinued, the acidic products are neutralized with caustic or soda ash. The organic sulphonate can be separated by a solvent extraction of the concentrated salt cake. The operation of the process will be made more apparent by consideration of the following examples, but the invention is by no means limited to the conditions or procedures set forth therein.

Example I

One hundred fifty grams of sodium chlorosulphonate (72% active ingredient) and 160 grams of tetraisobutylene placed in a flask equipped with a stirrer and condenser were heated on an oil bath at 140°–150° for four hours. The reaction product was poured onto 200 grams of ice, treated with sodium carbonate to neutralize excess sodium chlorosulphonate and steam distilled, thus removing 38.7% of the original material. The aqueous residue from the steam distillation was concentrated to a salt cake and extracted with alcohol to remove the organic sulphonate which upon analysis showed 9.13% sulphur and 0.33% chlorine.

| Analysis | Percent S | Percent Cl |
| --- | --- | --- |
| Calculated for $C_{16}H_{33}ClSO_3Na$ | 8.83 | 9.75 |
| Calculated for $C_{16}H_{31}SO_3Na$ | 9.81 | 0.00 |
| Found | 9.13 | 0.33 |

Aqueous solutions of the above product wet skeins of cotton thread readily.

Example II

To 150 grams of pinene heated to 120° C. was added 100 grams of 72% sodium chlorosulphonate in small portions. After half of the sodium chlorosulphonate was added, the temperature was raised to 140° C. When the addition was completed, a vigorous evolution of acidic fumes ensued, the reaction mixture thereupon acquiring a thick, jelly-like consistency. The product was cooled and steam distilled to remove 73.3% unreacted pinene. The residue from the steam distillation was neutralized with caustic, evaporated on a steam bath to a dry cake, and finally extracted with alcohol to remove the organic sulphonate which was obtained upon evaporation of the alcohol in the form of a syrup with approximately a 55% active ingredient content.

| Analysis | Percent S | Percent Cl |
| --- | --- | --- |
| Calculated for $C_{10}H_{16}ClSO_3Na$ | 11.65 | 12.95 |
| Calculated for $C_{10}H_{15}SO_3Na$ | 13.45 | 0.00 |
| Found (for the syrupy product) | 7.36 | 0.35 / 0.25 |

The above product is an efficient wetting agent for cotton fiber when used in alkaline solutions of mercerizing strength.

Example III

Two hundred grams of polymer gasoline having a boiling point range of 31° to 196° C., whose iodine number of 250 indicates an average composition of one double bond to each seven carbon atoms, and 300 grams of 72% sodium chlorosulphonate added in 100 gram portions were heated on a steam bath. A considerable amount of acidic fumes were given off. The reaction mixture was neutralized with caustic and then steam distilled to recover 25% unreacted hydrocarbon. The residue was concentrated to a thick syrup and then extracted with alcohol to separate the organic sulphonate from the inorganic material. Evaporation of the alcohol solution gave a product which on analysis showed 12.99% sulphur and 1.66% chlorine.

Example IV

One hundred grams of ethyl oleate and 100 grams of sodium chlorosulphonate were heated at 80° C. for 24 hours. The reaction product was neutralized with cold 5% sodium hydroxide and extracted with ether to remove unreacted ester which amounted to 57 grams. The aqueous portion was concentrated to a solid cake and then extracted with ethyl alcohol to remove the organic sulphonate. Concentration of the alcohol extract gave a syrupy product containing 6.11% sulphur and 2.50% chlorine.

Example V

One hundred seventy-two grams of sodium chlorosulphonate having an active ingredient content of 72% was added to 200 grams of hexadecene-1 in a 3-necked flask provided with a stirrer and a condenser and heated to 90–100° C. A reaction occurred as evidenced by a definite evolution of acidic fumes. The reaction was stopped after one hour and the resulting emulsion was poured into two liters of cold water and made alkaline with sodium carbonate to remove excess sodium chlorosulphonate. The unreacted hydrocarbon was separated as the upper layer. The aqueous layer containing the organic sulphonate and the inorganic sulphate and chloride was concentrated to dryness. Extraction of the dry cake with ethyl alcohol gave an organic sulphonate which upon analysis showed 9.51% sulphur and 6.56% chlorine.

| Analysis | Percent S | Percent Cl | $I_2$ No. |
| --- | --- | --- | --- |
| Calculated for $C_{16}H_{33}ClSO_3Na$ | 8.83 | 9.75 | |
| Calculated for $C_{16}H_{31}SO_3Na$ | 9.81 | 0.00 | 71.8 |
| Found | 9.51 | 6.56 / 6.13 | 33.0 |

Dilute aqueous solutions of the above product wet skeins of cotton thread rapidly when tested by the method of Draves and Clarkson (American Dyestuffs Reporter 20, 201 (1931)) and have a pronounced cleansing action.

This example is illustrative of the type of reaction which takes place with olefines containing a double bond in the 1-position. With these 1-alkenes the sodium chlorosulphonate acts, apparently indiscriminately, to give two types of compounds, one in which the chlorine is attached to the terminal carbon atom of the chain and the other in which the chlorine is attached to the second carbon atom. It appears that compounds of the latter type undergo dehydrohalogenation to form unsaturated sulphonates in the manner already suggested, whereas compounds of the former type do not. Possibly the carbon atom to which the sulphonate group is attached will not readily give up hydrogen for dehydrohalogenation. The result is, as indicated in the example, that the reaction product really consists in a mixture of chloroalkane sulphonates and unsaturated sulphonates.

When the unsaturated organic compound is ethylene, dehydrohalogenation does not take place, and the product is exclusively the sodium salt as shown in Example VI.

*Example VI*

One hundred sixty-eight grams of ethylene and 579 grams of 71.5% sodium chlorosulphonate were heated in an autoclave at 80–90° C. for eight hours. The reaction product was poured onto cold water, treated with sodium carbonate to neutralize the unreacted sodium chlorosulphonate, and then concentrated to a dry salt cake. Extraction of the latter with alcohol yielded sodium beta-chloroethanesulphonate as the monohydrate.

The processes of this invention are particularly adapted to the sulphonation of olefinic hydrocarbons, particularly aliphatic mono-olefinic hydrocarbons, and when so applied produce organic sulphonates free of hydrolyzable sulphate groups. They are not restricted, however, to this preferred embodiment but are also applicable to any unsaturated organic compound containing an olefinic linkage and free of sulphatable groups and, moreover, may even be practiced in the presence of sulphatable substituents. The following will serve to illustrate a few of the widely differing types of unsaturated compounds amenable to processing according to this invention: Propene, butene-1, butene-2, the isomeric pentenes, hexene-3 and the other hexenes, dodecene, tetradecene, octadecene, butadiene, isoprene, cyclopentene, cyclohexene, cyclohexadiene, styrene, propenyl benzene, vinyl naphthalene, camphene, bornylene, allyl chloride, chloroprene, methyl vinyl ketone, mesityl oxide, methyl sorbate, ethyl undecylenate, ethyl erucate, undecylenic acid nitrile, divinyl ether, linseed oil, oiticica oil, allylamine, methacrylamide, and allyl mercaptan.

The products obtained from the lower olefines such as are available from petroleum cracking operations are of interest as synthetic intermediates. The higher olefinic compounds such as are obtainable from the polymerization of low boiling olefines and decarboxylation of unsaturated acids and especially the unsaturated acids obtained by saponification of natural fats yield sodium sulphonates which are of particular interest as surface active, or capillary active materials. Such products are useful in any process involving wetting, penetrating, deterging, dispersing, emulsifying, frothing, demulsifying, foaming, flotation and kindred phenomenon.

The reaction is in general carried out at a temperature sufficient for dehydrohalogenation to take place. Actual dehydrohalogenation, however, does not take place with ethylene, as noted above. Ordinarily, a temperature of at least about 60° C. will be suitable but better results and more complete dehydrohalogenation is obtained at temperatures above about 80° C. The temperature may be as high as 200° C. or more but it is preferable to employ temperatures within the range between about 80° C. and about 150° C.

Pressures greater than atmospheric may be used and, with low boiling products or gases, the reaction, requiring at least 60° C., must be carried out in closed containers or autoclaves. High pressures, say up to 100 atmospheres or more, may be used. When operating under pressure it is desirable that provision be made for removing hydrogen chloride.

The examples given do not necessarily represent optimum conditions and those skilled in the art will at once realize that various expedients may be adopted to obtain higher yields and greater economy. Thus, since the process involves reaction of a solid and a fluid improved results may be obtained by the use of appropriate mixing or grinding devices to expose continually fresh surfaces of sodium chlorosulphonate for reaction with the unsaturated compound. Likewise, the yield can be improved by increasing the time of heating or by recycling the unsaturated compound with fresh sodium chlorosulphonate by the inclusion of other devices and expedients known or available in the art.

The proportion of reagents is not critical but in some cases it is desirable to use an excess of the unsaturated compound as a diluent for the reaction mixture and also to increase the efficiency of the process by utilization of a maximum of the sodium chlorosulphonate. The excess as well as the unreacted unsaturated hydrocarbon can be recovered and then recycled with more sodium chlorosulphonate. The addition of a solvent for the unsaturated compound is not necessary for the reaction. It may be used whenever it is desired to have more effective heat transfer.

It is, of course, not necessary to employ sodium chlorosulphonate of the character described. A lower strength material would be equally effective without unduly hindering the process. A higher strength, or even a one hundred per cent product, can also be used. Also, sodium chlorosulphonate prepared by any other method can be used. The other alkali metal chlorosulphonates (including the ammonium chlorosulphonates) may be substituted for sodium chlorosulphonate, and in its broadest aspects my invention may be practiced with a salt of chlorosulphonic acid.

It will be readily understood by those skilled in the art that other methods may be adopted for isolating the organic sulphonate. Thus, in some cases, isolation may be effected by separating the unreacted hydrocarbon as a separate layer or by steam distillation followed by concentration of the aqueous layer with or without separation of the organic sulphonate from the inorganic salt. The organic sulphonate, that is, the product of the reaction, may itself consist of a mixture of various sulphonates. In general, it has not been found necessary or desirable to effect separation of these different organic sulphonates.

Since many apparently widely differing embodiments of the invention may be made without departing from the spirit and scope thereof it is to be understood that such variations are included in the scope of the following claims.

I claim:

1. In the manufacture of organic sulphonates the method which comprises reacting at a temperature above 60° C. a salt of chlorosulphonic acid with a hydroxyl-free organic compound containing at least one non-benzenoid, carbon to carbon double bond.

2. In the manufacture of organic alkali metal sulphonates the method which comprises reacting at a temperature above 60° C. an alkali metal chlorosulphonate with an olefinic hydrocarbon.

3. In the manufacture of organic alkali metal sulphonates the method which comprises reacting at a temperature above 60° C. an alkali metal chlorosulphonate with an aliphatic mono-olefinic hydrocarbon.

4. In the manufacture of organic sodium sulphonates the method which comprises reacting at a temperature of about 80° C. to about 150° C. sodium chlorosulphonate with a hydroxyl-free organic compound containing at least one non-benzenoid, carbon to carbon double bond.

5. In the manufacture of organic sodium sulphonates the method which comprises reacting at a temperature of about 80° C. to about 150° C. a sodium chlorosulphonate with an olefinic hydrocarbon.

6. In the manufacture of organic sodium sulphonates the method which comprises reacting at a temperature of about 80° C. to about 150° C. sodium chlorosulphonate with an aliphatic mono-olefinic hydrocarbon.

7. In the manufacture of organic sulphonates the method which comprises reacting a salt of chlorosulphonic acid with an unsaturated organic compound free of sulphatable groups and containing a non-benzenoid carbon to carbon double bond comprised within the group

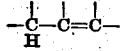

at a temperature sufficient to cause evolution of hydrogen chloride.

8. In the manufacture of organic sulphonates the method which comprises reacting a salt of chlorosulphonic acid with an unsaturated organic compound free of sulphatable groups and containing a non-benzenoid carbon to carbon double bond comprised within an aliphatic hydrocarbon chain of at least 3 carbon atoms at a temperature sufficient to cause evolution of hydrogen chloride.

9. In the manufacture of organic sulphonates the method which comprises reacting at a temperature above 60° C. a salt of chlorosulphonic acid with tetraisobutylene.

10. In the manufacture of organic sulphonates the method which comprises reacting at a temperature above 60° C. a salt of chlorosulphonic acid with pinene.

11. In the manufacture of organic sulphonates the method which comprises reacting at a temperature above 60° C. a salt of chlorosulphonic acid with ethylene.

12. In the manufacture of organic sodium sulphonates the method which comprises reacting at a temperature of about 80° C. to about 150° C. sodium chlorosulphonate with tetraisobutylene.

13. In the manufacture of organic sodium sulphonates the method which comprises reacting at a temperature of about 80° C. to about 150° C. sodium chlorosulphonate with pinene.

14. In the manufacture of organic sodium sulphonates the method which comprises reacting at a temperature of about 80° C. to about 150° C. sodium chlorosulphonate with ethylene.

15. In the manufacture of organic sulphonates the method which comprises reacting a salt of chlorosulphonic acid with tetraisobutylene at a temperature sufficient to cause evolution of hydrogen chloride.

16. In the manufacture of organic sulphonates the method which comprises reacting a salt of chlorosulphonic acid with pinene at a temperature sufficient to cause evolution of hydrogen chloride.

JAMES HERBERT WERNTZ.